United States Patent
Pich et al.

(10) Patent No.: US 8,776,880 B2
(45) Date of Patent: Jul. 15, 2014

(54) PROCESS FOR ENHANCED OIL RECOVERY USING THE ASP TECHNIQUE

(75) Inventors: Rene Pich, Saint Priest en Jarez (FR); Ludwig Gil, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 13/231,243

(22) Filed: Sep. 13, 2011

(65) Prior Publication Data

US 2012/0067579 A1  Mar. 22, 2012

(51) Int. Cl.
*E21B 43/16* (2006.01)

(52) U.S. Cl.
USPC ...... 166/268; 166/305.1; 166/310; 166/270.1

(58) Field of Classification Search
None
See application file for complete search history.

(56) References Cited

U.S. PATENT DOCUMENTS

| | | | | |
|---|---|---|---|---|
| 3,780,806 A | * | 12/1973 | Bott | 166/275 |
| 3,815,679 A | * | 6/1974 | Blanke et al. | 166/275 |
| 4,644,020 A | * | 2/1987 | Stahl | 522/79 |
| 4,694,906 A | * | 9/1987 | Hutchins et al. | 166/294 |
| 4,714,113 A | * | 12/1987 | Mohnot et al. | 166/270 |
| 5,735,349 A | * | 4/1998 | Dawson et al. | 166/295 |
| 6,932,909 B2 | * | 8/2005 | Rey | 210/698 |
| 2008/0161209 A1 | * | 7/2008 | Wood | 507/217 |
| 2009/0151941 A1 | | 6/2009 | Dwarakanath et al. | |
| 2010/0197529 A1 | * | 8/2010 | Favero et al. | 507/222 |
| 2011/0104038 A1 | * | 5/2011 | Ditommaso et al. | 423/430 |

FOREIGN PATENT DOCUMENTS

| | | |
|---|---|---|
| CN | 1 749 185 | 3/2006 |
| FR | 2 920 818 | 3/2009 |
| FR | 2 932 470 | 12/2009 |
| WO | 2008/107492 | 9/2008 |

* cited by examiner

*Primary Examiner* — Zakiya W Bates
*Assistant Examiner* — Silvana Runyan
(74) *Attorney, Agent, or Firm* — Clark & Brody

(57) ABSTRACT

A process for the enhanced recovery of oil in a deposit introduces into the deposit an alkaline aqueous solution of a water-soluble polymer containing a surfactant. The aqueous solution of water-soluble polymer introduced is prepared with an aqueous solution initially containing $Ca^{2+}$ and $Mg^{2+}$ ions treated with an alkaline agent and a dispersant, so as, prior to the introduction of the polymer and the surfactant into the aqueous solution, to precipitate, under the action of the alkaline agent and of $CO_2$ optionally dissolved in the aqueous solution, the $Ca^{2+}$ and $Mg^{2+}$ ions. The precipitates are especially in the form of precipitates of calcium carbonate and of magnesium hydroxide and are dispersed owing to the dispersant, which is chosen in order to limit the size of the calcium carbonate and magnesium hydroxide precipitates.

13 Claims, No Drawings

PROCESS FOR ENHANCED OIL RECOVERY USING THE ASP TECHNIQUE

The present invention relates to the technical field of the enhanced recovery of oil in a deposit. More specifically, one subject of the present invention is an improved process for enhanced oil recovery using the ASP ("alkaline-surfactant-polymer") technique, according to which an alkaline solution of a water-soluble polymer containing at least one surfactant is injected into the deposit. The process according to the invention makes it possible to limit the risks due to the presence of $Ca^{2+}$ and $Mg^{2+}$ ions in the waters used for the preparation of the aqueous solution injected.

The enhanced oil recovery may be carried out with various processes: injection of solvent, $CO_2$, steam, electric currents, ultrasonic rays, etc. but in the case of oil fields at a relatively low temperature, the modification of mobility by injection of polymer proves the simplest and least expensive.

It is known in the prior art that synthetic water-soluble polymers and, in particular, acrylamide-based polymers are polymers that are highly advantageous for increasing the viscosity of aqueous solutions. The increase in the viscosity of the injected aqueous solution by a water-soluble polymer of high molecular weight will make it possible to render the mobilities of the water and of the oil in place more or less equal.

In this process, only the volume of the reservoir treated comes into play via an enlargement of the flushing bulb, corresponding to the zone flushed by the injected solution.

Such an enhanced oil recovery process has several variants which have been developed in order to attempt to improve the amount of oil recovered.

Recent theories that are based on the viscoelasticity of polymers having very high molecular weights have involved an improvement in the intrinsic recovery, but these theories apply only to laboratory polymers or those polymers that are not very degraded in the field, which is not the case in most of the current industrial projects.

In order to mobilize more of the oil in place, it has also been envisaged to change the water-oil interfacial tensions and to emulsify a portion of the oil not mobilized by the polymer alone. In this case, the addition of a surfactant makes it possible to reduce the surface tension between the crude oil trapped in the subterranean formation and the injected solution. This drop in surface tension thus enables the injected solution to penetrate deeply into the subterranean formation and to be in contact with the oil. Such a process known as an SP (surfactant-polymer) process is used in a limited number of projects since the amount of surfactant needed may be very large (often 5 to 15 times the amount of polymer) in order to obtain an effective interfacial tension.

Another method is to use the salification of the acidity of the oil via a base in order to achieve very low interfacial tensions with the aid of a surfactant (<0.01 mN/m) at a cost compatible with the price of oil. In such a process, known as an ASP ("alkaline-surfactant-polymer") process, a small amount of surfactant is present in an alkaline aqueous solution of water-soluble polymer which is injected into the well. The alkaline agent then reacts with the acid compounds present in the crude oil in order to form in situ additional surfactants which participate in the lowering of the surface tension. In general, it is necessary to use, on average:
  more than 2000 ppm of polymer,
  more than 2000 ppm of surfactant,
  5 to 10 000 ppm of base (sodium carbonate, sodium hydroxide, potassium hydroxide, sodium borate, sodium bicarbonate, etc.).

Obviously, the effectiveness depends on the degree of acidity of the oil which will change its hydrophilic-hydrophobic balance as a function of the degree of neutralization.

The injection of an alkaline solution within an oil reservoir or deposit is not without difficulties, due to the presence of divalent metal cations such as $Ca^{2+}$, $Mg^{2+}$ or $Ba^{2+}$ in the injected water or in the water already present in the deposit, which will have tendency to precipitate, either in the injection zones, thus obstructing the passages for the injected solution drastically reducing its injectivity, or within the deposit. In general, the waters used for preparing the aqueous solutions injected contain between 100 and 2000 ppm of $Ca^{2+}$ and $Mg^{2+}$ ions.

When sodium hydroxide is used as a base in an ASP process, the calcium precipitated in the form of lime $Ca(OH)_2$ is relatively soluble and the calcium carbonate originating from the $CO_2$ loading of the waters used in the injected solution is customarily found in a small amount. It is observed that the injectivity into the wells is normally maintained when the amount of $CO_2$ is not too high. However, the very large increase in the pH, due to the use of sodium hydroxide as alkaline agent for obtaining the desired effect on the dispersion of the oil, results in silica dissolving, forming soluble sodium silicate. This sodium silicate precipitates alone or with the magnesium salts near to the producing well forming extremely hard scale in the lift pumps, leading to very frequent breakdowns (8 days to 2-3 months) preventing any continuous production. It is this method which had been massively developed, for example, on the Daqing oil field (China) and abandoned for pump maintenance reasons.

Sodium carbonate is the most commonly used base for neutralizing the acidity of the oil and enables it to be dispersed in the injection water with the aid of an injected synthetic surfactant. However, as indicated previously, in most cases, the injection waters or the brines produced by the producing wells and treated in order to be injected, contain large amounts of $Ca^{2+}$ and $Mg^{2+}$ (100 to 2000 ppm on average) which precipitate in the form of calcium carbonate and magnesium hydroxide. Since the latter is colloidal, it can be injected without too much damage for the field. On the other hand, calcium carbonate has a tendency to crystallize in the injection zones very rapidly decreasing the injectivity until it is blocked.

The solution used currently to minimize these precipitation problems due to the presence of divalent metal ions is a softening of the waters to be injected, in particular with sulphonic or carboxylic exchange resins depending on the salinity of the water. But the softening requires a harsh treatment of the oil that is found with the production waters and regenerations by brines for the sulphonic resins or by an acid and a base for the carboxylic resins in the case of waters having a high salinity.

Another solution consists in complexing the divalent metals to prevent their precipitation, but the cost of the operation is prohibitive.

When sodium carbonate is used as a base in ASP operations, it may appear natural to inject a certain amount of dispersant in order to prevent the crystallization, in the field, of the calcium carbonate formed. However, it is observed that at the normal doses of dispersant (10 to 20 ppm) which make it possible to disperse this carbonate in fine form, the result obtained on the field is negative. The injectivity gradually drops.

This is why such a method is used in U.S. Pat. No. 4,714,113 in the name of PPG Industries for operations consisting in blocking, inside a deposit, the zones of high permeability into which the injected solution preferably infiltrates (known as water shut-off). The dispersant is injected with an alkaline aqueous solution into the field in order to block, via precipitation, the channelings which have a tendency to reduce the effectiveness of the injection. The amount of dispersant is adjusted in order to prevent a premature precipitation, given that this precipitation must take place inside the well (as mentioned in column 5, lines 23-25).

There is therefore a need for novel solutions that make it possible to reduce the risks of precipitation of $Ca^{2+}$ and $Mg^{2+}$ ions, in the form of precipitates which risk being deposited in the injection zone or within the deposit. In this context, the present invention proposes to provide a novel process of the ASP type for enhanced oil recovery which makes it possible to obtain a satisfactory infectivity of the alkaline solution of polymer into the oil reservoir. For more details on processes of the ASP type, reference may be made in particular to the article SPE 78711.

Therefore, the invention relates to a process for the enhanced recovery of oil in a deposit owing to the introduction, into the deposit, of an alkaline aqueous solution of a water-soluble polymer containing a surfactant, characterized in that the aqueous solution of water-soluble polymer introduced is prepared with an aqueous solution initially containing $Ca^{2+}$ and $Mg^{2+}$ ions which is treated, prior to the introduction of the polymer and of the surfactant into the aqueous solution, with an alkaline agent and a dispersant. Such a pretreatment is carried out so as to precipitate, under the action of the alkaline agent and of the $CO_2$ optionally dissolved in the aqueous solution, the $Ca^{2+}$ and $Mg^{2+}$ ions, especially in the form of precipitates of calcium carbonate and of magnesium hydroxide, and to disperse said precipitates owing to the dispersant, the nature and amount of which are chosen in order to limit the size of the precipitates formed, especially the calcium carbonate and magnesium hydroxide precipitates formed.

According to one particular embodiment, the aqueous solution is prepared by pretreating an aqueous solution containing $Ca^{2+}$ and $Mg^{2+}$ ions with at least one dispersant and at least one alkaline agent, stirring the alkaline aqueous solution thus obtained for sufficient time so that the average size of 10%, by volume, of the largest precipitates present in the aqueous solution is less than 5μ, (then referred to as optimal precipitation), then introducing at least one water-soluble polymer and at least one surfactant. Within the context of the invention, the size of the precipitates is, for example, determined using a Mastersizer 2000 device from the company MALVERN with a mathematical model based on the Mie scattering theory.

The polymeric solution injected is usually directly prepared on site, in the vicinity of the oil deposit in which it will be used. Purified water, but also seawater, river water, dam water or aquifer water directly available on the site may directly be used. Before incorporation of the dispersant and of the alkaline agent, the aqueous solution generally contains from 50 to 2000 ppm of $Ca^{2+}$ and $Mg^{2+}$ ions. The preliminary contacting time is dependent on the composition of the waters used for the preparation of the aqueous solution of polymer to be injected. The order of addition of the dispersant and of the alkaline agent is not important. They will be able, for example, to be introduced at the same time or the dispersant before the alkaline agent. The stirring time of the alkaline aqueous solution, which makes it possible to obtain an optimal precipitation, in dispersed form, of the $Ca^{2+}$ and $Mg^{2+}$ ions, varies, for example, from a few tens of minutes to a few hours and is, preferably, greater than or equal to 1 hour. It appears, in the cases tested, that a separate contact time of one hour is, usually, sufficient after a rapid, either dynamic or static, stirring at the time of mixing. It is also possible to carry out a first treatment under rapid stirring, then to prolong the treatment under a more moderate stirring. The process according to the invention may be set up easily with equipment, usually existing equipment, for water storage in particular.

Within the context of the invention, it has been demonstrated that the process for dispersing the calcium carbonate formed may be effective, in the case of an ASP process, for preventing the $Ca^{2+}$ and $Mg^{2+}$ ions from forming precipitates able to be deposited in the introductory zone or in deeper zones within the deposit and able to limit the injectivity of the aqueous solution of water-soluble polymer, on condition that the calcium carbonate is precipitated and dispersed before the injection of the aqueous solution of water-soluble polymer within the deposit, but also before the introduction of the water-soluble polymer and of the surfactant into the aqueous solution. This appears to be linked to the fact that calcium carbonate has a tendency to precipitate slowly and to remain for a certain time in supersaturation. In this case, the precipitation may concentrate at preexisting nuclei and the particles enlarge, even in the presence of dispersant, in zones having a very low velocity and very low shear. There is then a very large heterogeneity of particles that rapidly block the injectivity.

Preferably, the amount of dispersant should be high enough so that there is an amount of free dispersant in the aqueous solution containing the water-soluble polymer which will be injected into the deposit. Preferably, this amount should be high enough so that dispersant in free form also remains in the production waters, that is to say in the aqueous solutions which are recovered at the outlet of the deposit.

The dispersants that can be used are widely described in the literature. The main ones are the following:

poly(meth)acrylates and copolymers with acrylamide, sodium acrylamidomethylpropane sulphonate, hydroxypropyl methacrylate, vinyl polymers, especially polymers of sodium vinyl sulphonate, of sodium methallyl sulphonate, or of derivatives thereof, homopolymers or copolymers of maleic acid or of one of its derivatives, phosphonates such as phosphonobutane tricarboxylic acid (Dequest 7000), amino trimethylene phosphonic acid (ATMP), hydroxy-ethylidene diphosphonic acid (HEDPA) or its sodium salt (HEDP.Na$_2$), diethylenetriamine pentamethylene phosphonic acid (DTPMPA), and lignosulphates.

The dispersants, of polymeric nature, mentioned above generally have a molecular weight of less than or equal to 100 000 g/mol, in particular within the range from 200 to 50 000 g/mol.

To date, dispersants have been used, for example, in order to disperse the barium sulphate precipitated by mixing seawater and production water before injection, but the amounts added were very limited and were of the order of 5 to 20 ppm. But in this case, the precipitate is instantaneous in the form of extra-fine particles. In the case of an ASP treatment, these amounts are insufficient in order to stabilize the calcium carbonate and to prevent its gradual crystallization. This appears to be due to the changes in the solubility throughout its presence in the fields. Its solubility changes over time due to:

reaction with the acid functions of the oil which changes the pH, equilibrium with the inorganic compounds (sand, clays, mineral salts, etc.), the $CO_2$ equilibrium as a function of the temperatures and of the pressures, and the pressure of the field.

The main factor for efficient operation is the precipitation of the calcium carbonate with a small enough particle size so as to avoid the decrease in infectivity observed with the addition of an alkaline agent such as sodium carbonate. The amount of dispersant that is sufficient to keep this dispersion in the field usually lies within the range extending from 20 to 500 ppm under normal ASP conditions and more particularly within the range extending from 30 to 200 ppm (1 ppm corresponding to 1 mg/l).

The selection of the optimum dispersant, within the context of the invention, is carried out as a function of the water used in the aqueous solution which will be injected into the field, for example, by virtue of laboratory tests with the alkaline solution used containing the dispersant by evaluating, in particular, the size of the calcium carbonate particles formed. Such tests may be carried out starting from a core sample of the field, water (or brine) used for preparing the aqueous solution which will be injected, and consist of an addition of dispersant into the aqueous solution containing the alkaline agent, then a moderate stirring (around 500 rpm with a 5 cm blade) for 24 hours at 50° C. Next, the size of the particles obtained is measured with a Mastersizer type machine from Malvern and it is possible to classify the products according to their efficiency. Advantageously, the nature and the amount of dispersant are selected so that the average size of 10%, by volume, of the largest precipitates is less than 5μ. The amount of dispersant used corresponds, for example, to the value determined by the laboratory test making it possible to have an average size of the largest precipitates formed that corresponds to 10% by volume of all of the precipitates formed of less than or equal to 5μ, increased by 30%.

Next, during the oil recovery process, it is possible to adjust the amount of dispersant introduced into the aqueous solution. For example, if the injection pressure remains constant, then it is possible to reduce the amount of dispersant. If the injection pressure increases (plugging), then it is preferable to increase the amount of dispersant. Such adjustments of the compositions of the solutions injected, over time, are very common for oil workers.

The process according to the invention is suited to any type of water-soluble polymer known for having a thickening role and/or conventionally used in oil recovery processes.

In particular, the water-soluble polymer(s) present in the aqueous solution may, in particular, be any type of synthetic or natural organic polymer that is soluble in water. In particular, the water-soluble polymers described by the applicant in patent application FR 2 932 470 could be present in the aqueous solution injected. Mention is made, for example, of acrylamide-based polymers. Usually, the water-soluble polymer used has a molecular weight greater than or equal to 1 million g/mol, in particular belonging to the range extending from 1 to 25 million g/mol. Polymers based on acrylamide (representing, preferably, at least 10 mol %) copolymerized with a choice of acrylic acid, 2-acrylamido-2-methylpropanesulphonic acid or N-vinyl-pyrrolidone will be preferred.

The aqueous solution could contain, for example, a concentration of water-soluble polymer of at most 10 g/l, and preferably of at most 5 g/l of aqueous solution into which it is injected. Finally, advantageously, the aqueous solution of water-soluble polymer obtained has an optimal viscosity within the range extending from 20 to 60 cps (centipoise), (viscosity measurements at 20° C. with a Brookfield viscometer with a UL module and at a rate of 6 rpm).

The aqueous solution injected contains, in addition, one or more surfactants. The surfactants may, for example, be chosen from anionic surfactants and their zwitterions chosen from the group comprising derivatives of alkyl sulphates, alkyl ether sulphates, aryl alkyl sulphates, aryl alkyl ether sulphates, alkyl sulphonates, alkyl ether sulphonates, aryl alkyl sulphonates, aryl alkyl ether sulphonates, alkyl phosphates, alkyl ether phosphates, aryl alkyl phosphates, aryl alkyl ether phosphates, alkyl phosphonates, alkyl ether phosphonates, aryl alkyl phosphonates, aryl alkyl ether phosphonates, alkyl carboxylates, alkyl ether carboxylates, aryl alkyl carboxylates, aryl alkyl ether carboxylates, alkyl polyethers and aryl alkyl polyethers. Within the context of the invention, the term “alkyl” is understood to mean a saturated or unsaturated hydrocarbon-based group having 6 to 24 carbon atoms which is branched or unbranched, linear or that optionally comprises one or more cyclic units, which may optionally comprise one or more heteroatoms (O, N, S). An “aryl alkyl” group is understood to mean an alkyl group as defined previously, comprising one or more aromatic rings, it being possible for said aromatic rings to optionally comprise one or more heteroatoms (O, N, S).

The aqueous solution injected is alkaline, with a pH in particular within the range of 8 to 12. This solution contains one or more alkaline agents, for example chosen from hydroxides, carbonates and bicarbonates of an alkali metal or of ammonium, such as sodium carbonate. The amounts of alkaline agent introduced into the aqueous solution generally correspond to 0.5 to 15 times the total mass of water-soluble polymer subsequently introduced into the aqueous solution.

Within the context of the invention, the final aqueous solution containing the desired polymer(s) is then injected into an oil deposit, according to any technique known to a person skilled in the art in the processes for enhanced oil recovery also known as “EOR”. At the outlet of the deposit, production waters are recovered, with the extracted oil. The preparation of the aqueous solution injected is, usually, carried out on site, just upstream of its injection into the deposit. The pretreatment of the aqueous solution with the alkaline agent and the dispersant could be carried out, in particular in a storage tank, with the selected method of stirring, usually with a mechanical stirrer. Next, the polymer and the surfactant will be able to be added, together or separately, to the aqueous solution, for example, in a line for circulating the aqueous solution and, for example, for the polymer, by means of a unit as described in patent application WO 2008/107492, and sold by the applicant under the reference PSU “Polymer Slicing Unit”.

The process according to the invention applies to the fields of a medium permeability of greater than or equal to 500 millidarcies. Nevertheless, each field that reinjects production waters containing a certain amount of solids has its own rules. A medium permeability is measured using Darcy’s law and in particular the procedure described in the document “Recommended Practice for determining permeability of porous media”, document RP27 from the “American Petroleum Institute”. It characterizes the ability of a fluid to pass through a rock formation.

The process according to the invention is also perfectly suitable for wells at low or medium temperature, with for example acrylamide/acrylic acid copolymers up to about 75° C., copolymers of acrylamide/sulphone-containing monomers up to 105° C., and copolymers containing polyvinylpyrrolidone up to 120° C.

The process according to the invention makes it possible to maintain a satisfactory infectivity of the aqueous solution into the oil well while avoiding the formation of precipitates of calcium carbonate of large size within the deposit which would risk obstructing certain passages. Advantageously, the process according to the invention does not comprise a step of complexing the $Ca^{2+}$ or $Mg^{2+}$ ions, nor a softening step, as described in the prior art.

The laboratory tests below make it possible to better understand the mechanisms used in this invention.

A) Particle Size

Taking, as an example, a brine from an oil field having the following composition:

$Na^+$: 1872.4 mg/l
$Cl^-$: 2799.6 mg/l
$Ca^{2+}$: 46.8 mg/l
$Mg^{2+}$: 14 mg/l
$K^+$: 26.2 mg/l
$HCO^-_3$: 409.6 mg/l, a potential ASP composition was determined in the laboratory, via injection tests on core samples (taken from the oil field, the average permeability of which is 1000 millidarcies and the average porosity 26%). This potential ASP composition is the following:

Polymer 3630S (30/70 mol % acrylic acid/acrylamide copolymer having a molecular weight of 20 million g/mol) from the company SNF: 2200 ppm, Surfactant Petrostep® A-1 (alkyl benzene sulphonate anionic surfactant) supplied by Stepan: 4000 ppm, Sodium carbonate: 4000 ppm to bring the pH to 10.5.

The porosity, expressed as a percentage, is the volume of the voids (pores) in the rock relative to the total volume of the rock.

1) In a first procedure, various dispersants in an amount of 100 ppm are added and the average size of the calcium carbonate particles and magnesium hydroxide particles precipitated are measured using the Mastersizer 2000 device from Malvern, together with the size of 10%, by volume, of the largest particles, this being after stirring for 24 hours at 50° C.

The results are the following:

| | Molecular weight (MW in g/mol) | Average size (μ) | Average size of the largest 10% (μ) |
|---|---|---|---|
| Na polyacrylate | MW 3000 | 1.90 | 3.38 |
| Na polyacrylate | MW 5000 | 2.17 | 4.80 |
| Na polyacrylate | MW 1000 | 1.68 | 6.90 |
| Maleic acid/acrylic acid copolymer | MW 2000 | 2.73 | 8.87 |
| Acrylic acid/ATBS (sodium acryloyldimethyl taurate) copolymer (70/30 mol %) | MW 2000 | 2.14 | 4.42 |
| Acrylic acid/hydroxypropyl acrylate copolymer (80/20 mol %) | MW 2000 | 3.57 | 7.55 |
| Polymaleic anhydride | MW 400 | 6.08 | 11.20 |
| ATMP | | 1.53 | 2.55 |
| HEDPA | | 2.52 | 4.71 |
| DTPMPA | | 1.77 | 5.65 |
| Polyacrylate/ATMP mixture (50/50 wt %) | MW 3000 | 1.42 | 2.10 |

It is possible to make a selection out of all of the dispersants available on the market taking into account their thermal stability as a function of the temperature.

It is observed, for example, that the polyacrylate MW 3000-ATMP mixture retains its particle size after 6 months of gentle stirring.

B) Particle Size Distribution

To verify the need to pre-precipitate the calcium carbonate, the following test was carried out:

Into a tube having a diameter of inch by 300 meters long, an ASP composition as defined in paragraph A) containing 100 ppm of polyacrylate 3000-ATMP mixture (50/50) was injected (as a single passage into the coil tube which simulates the injection) at a rate of 3 m/sec under the following conditions:

1) The brine was pumped directly into the tube with addition of a polymer-surfactant-sodium carbonate-dispersant mixture. Next, the solution is recovered and stirred in the laboratory at 500 rpm (blade diameter: 5 cm) for 24 h at 50° C., then the particle size is measured.

2 The brine was treated with sodium carbonate in the presence of dispersant for two hours (30 minutes at 500 rpm, then 90 minutes at 100 rpm), then added to solutions of polymer and of surfactant and finally pumped into the same tube. Likewise, the particle size was measured after 24 hours of stirring at 500 rpm at 50° C.

In Case No. 1:
The average particle size is 5.84 μm,
The average size of 10%, by volume, of the largest particles is 15.12 μm.

In Case No. 2:
The average particle size is 1.89 μm,
The average size of 10%, by volume, of the largest particles is 3.38 μm.

There is therefore clearly a difference in the behaviour and crystallization of the calcium carbonate between a separate preliminary precipitation and a precipitation in the presence of polymer and surfactant.

Furthermore, tests showed that it was possible to continue the mixing in case 2) for 6 months without the particles enlarging at all.

An injectivity test was also carried out over a short duration on a well of the oil field (the average permeability of which is 1000 millidarcies and the average porosity 26%) corresponding to the brine tested.

The flow rate for injecting water by water flooding was 27 m³/h with a pressure of 77 bar (varying from 70-81 bar). The estimated fracturing pressure was 85 bar.

The brine and the dispersant and the sodium carbonate (4000 ppm) were mixed in a first 2 m³ tank with vigorous stirring (0.60 meter blades at 1000 rpm), then stored in a tank with gentle stirring for 12 hours.

The polymer was dissolved at a concentration of 10 000 ppm in this precipitated brine and the surfactant was diluted twice with this same brine in order to be metered into a wellhead and mixed using high-efficiency static mixers to the contents determined by the laboratory tests.

The observations were the following:

The pressure gradually dropped over 18 hours to bar probably due to the fluid friction reduction (drag reduction) in the well, Then it rose back up over 10 days to 78 bar and fluctuated between 74 and 80 bar over the 60 days that the injection, with a flow rate of 25 to 28 m³/h, lasted. There was no loss of filterability observed during this period.

The invention claimed is:

1. A process for an enhanced recovery of oil in a deposit wherein an alkaline aqueous solution of a water-soluble polymer, containing a surfactant, is introduced into said deposit, in which the preparation of the alkaline aqueous solution of the water-soluble polymer comprises the following steps:
   treating an aqueous solution, initially containing $Ca^{2+}$ and $Mg^{2+}$ ions, with an alkaline agent and a dispersant to form a treated aqueous solution, and
   subsequently introducing, in said treated aqueous solution, a water-soluble polymer and a surfactant, to form said alkaline aqueous solution,
   said process also including the recovery oil of the deposit.

2. The enhanced oil recovery process according to claim 1, characterized in that conditions to form said treated aqueous solution are carried out so as to precipitate, under the action of the alkaline agent and of $CO_2$ in said aqueous solution, the $Ca^{2+}$ and $Mg^{2+}$ ions,
and to disperse said precipitates owing to the dispersant, the nature and amount of which are chosen in order to limit the size of the precipitates formed.

3. The enhanced oil recovery process according to claim 2, wherein the precipitates are calcium carbonate and magnesium hydroxide.

4. The enhanced oil recovery process according to claim 1, characterized so that, stirring the alkaline aqueous solution thus obtained so that the average size of 10% by volume of the largest precipitates present in the aqueous solution is less than 5μ, then introducing at least one water-soluble polymer and at least one surfactant.

5. The enhanced oil recovery process according to claim 4, characterized in that a stirring time of the alkaline aqueous solution is greater than or equal to 1 hour.

6. The enhanced oil recovery process according to claim 1, characterized in that the alkaline aqueous solution of water-soluble polymer introduced into the deposit contains dispersant in free form.

7. The enhanced oil recovery process according to claim 6, characterized in that the process waters recovered at the outlet of the deposit contain dispersant in free form.

8. The enhanced oil recovery process according to claim 1, characterized in that the deposit has a mean permeability greater than or equal to 500 millidarcies.

9. The enhanced oil recovery process according to claim 1, characterized in that the amount of dispersant is within the range extending from 20 to 500 ppm.

10. The enhanced oil recovery process according to claim 1, characterized in that the dispersant is selected from the group consisting of:
   poly(meth)acrylates and copolymers with acrylamide, sodium acrylamidomethylpropane sulphonate, hydroxypropyl methacrylate,
   vinyl polymers, especially polymers of sodium vinyl sulphonate, of sodium methallyl sulphonate, or of derivatives thereof,
   homopolymers or copolymers of maleic acid or of one of its derivatives,
   propionates such as phosphonobutane tricarboxylic acid (Dequest 7000), amino trimethylene phosphonic acid (ATMP), hydroxyethylidene diphosphonic acid (HEDPA) or its sodium salt (HEDP.Na2), diethylenetriamine pentamethylene phosphonic acid (DTPMPA), and lignosulphates.

11. The enhanced oil recovery process according to claim 1, characterized in that the alkaline agent is selected from the group consisting of hydroxides, carbonates and bicarbonates of an alkali metal or of ammonium.

12. The enhanced oil recovery process according to claim 1, characterized in that the alkaline agent is sodium carbonate.

13. The enhanced oil recovery process according to claim 9, characterized in that the amount of dispersant is within the range extending from 30 to 200 ppm.

* * * * *

UNITED STATES PATENT AND TRADEMARK OFFICE
CERTIFICATE OF CORRECTION

Page 1 of 1

PATENT NO. : 8,776,880 B2
APPLICATION NO. : 13/231243
DATED : July 15, 2014
INVENTOR(S) : Rene Pich et al.

It is certified that error appears in the above-identified patent and that said Letters Patent is hereby corrected as shown below:

Title Page:

Insert

--(30)  Foreign Application Priority Data

Sep. 20, 2010   (FR) .....................10 57479--

Signed and Sealed this
Twentieth Day of January, 2015

Michelle K. Lee
*Deputy Director of the United States Patent and Trademark Office*